United States Patent [19]
Zoltan

[11] 3,915,019
[45] Oct. 28, 1975

[54] OPTICAL GYRO PICK-OFF

[75] Inventor: Bart J. Zoltan, Emerson, N.J.

[73] Assignee: The Singer Company, Little Falls, N.J.

[22] Filed: Feb. 21, 1974

[21] Appl. No.: 444,418

[52] U.S. Cl. .......................... 74/5.6 A; 250/231 GY
[51] Int. Cl. ............................................. G01c 19/28
[58] Field of Search ...................... 74/5.6 R, 5.6 A; 250/231 GY, 202

[56] References Cited
UNITED STATES PATENTS

| | | | |
|---|---|---|---|
| 2,959,060 | 11/1960 | Kunz | 74/5.6 A |
| 3,071,976 | 1/1963 | Kunz | 74/5.6 A |
| 3,328,595 | 6/1967 | Todd, Jr. | 74/5.6 A |
| 3,528,299 | 9/1970 | Volk | 74/5.6 A |

Primary Examiner—Manuel A. Antonakas
Attorney, Agent, or Firm—T. W. Kennedy

[57] ABSTRACT

An optical system senses light reflected from a repetitive pattern of alternate, pseudotriangular reflective and nonreflective areas provided on a spherical surface of a gyro rotor. The waveform representing the level of reflected light is pulse duration modulated by the pattern in a manner directly proportional to displacement of the gyro rotor about an output axis.

12 Claims, 9 Drawing Figures

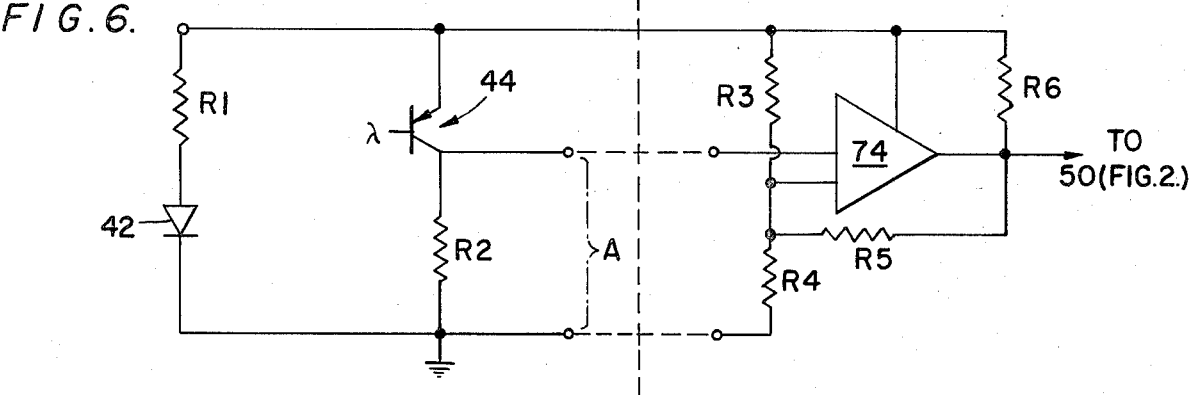
FIG. 6.
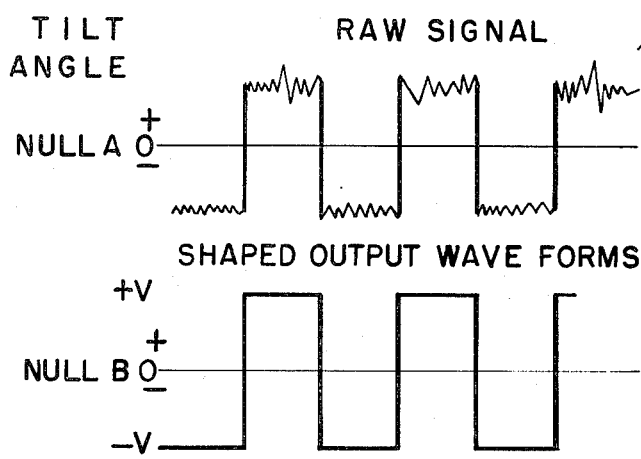
FIG. 7.
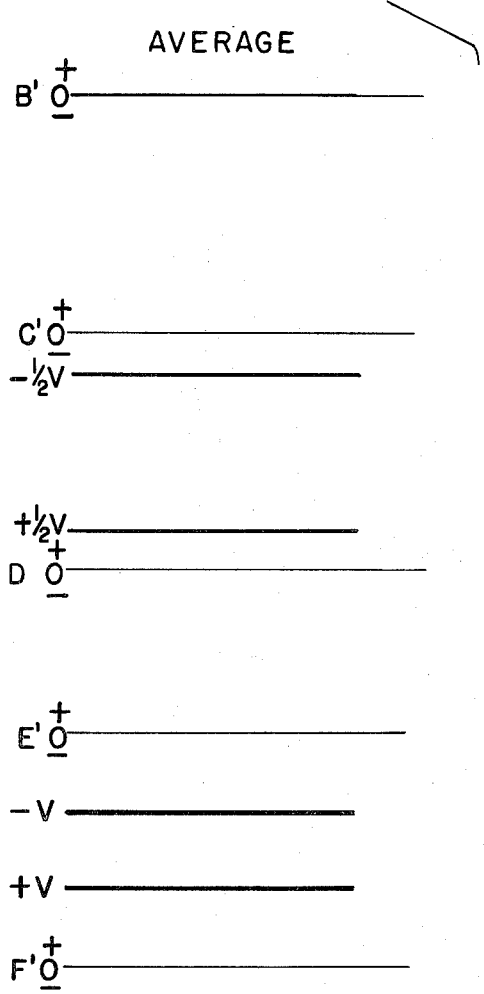

OPTICAL GYRO PICK-OFF

BACKGROUND OF THE INVENTION

The invention relates generally to the field of gyroscopic sensors, and more particularly to means for generating an electrical signal indicative of the angular displacement of a spherical gyro rotor about an output axis.

In the past, pick-off mechanisms for detecting angular displacement of a gyro rotor have been based on electromagnetic, capacitive and fluidic, systems as well as optical detection techniques. All these techniques have in common the use of a stationary detector or detectors whose output is sensitive to the distance between the detector and a portion of the rotor or the orientation of the rotor relative to the detector. Electromagnetic pick-offs require costly electrical windings and several machined parts per axis. Both electromagnetic and capacitive types of gyro pick-offs require modulated excitation (e.g., sinusoidal) and demodulation circuitry. Previously used optical pick-off schemes were constrained to a pulse duration modulated output which was locked to the rotor speed in its repetition rate. Both fluidic and optical pick-offs in the past have been placed on the spin axis and have used quadrant detector schemes in which displacement is an algebraic combination of the quadrant outputs. The resulting increase in the overall length of the gyro assembly in the direction of the spin axis is unacceptable in many applications.

SUMMARY OF THE INVENTION

The general purpose of the invention is to generate an output from a single photodetector representing the angular displacement of a gyro rotor about an output axis. Specific objects of the invention are to avoid significant crosscoupling between two output axes, to avoid structural modification of the gyro rotor and to avoid placing the optical pick-off in line with the rotor spin axis.

It has been discovered that these and other objects of the invention can be realized without the shortcomings of the prior art techniques by sensing light reflected from a spherical surface of a gyro rotor bearing a special repetitive pattern of reflective and nonreflective pseudotriangular areas having a geometry such that the resulting pulse duration modulation of the binary output of a simple photodetector is directly proportional or linearly related to displacement about an output axis. Considering the designation of position on the sphere by means of longitude and latitude, the pattern circumscribes an area on a spherical ring-shaped surface of the rotor between two latitudes spaced according to the angular freedom of the gyro. Pseudotriangular areas are drawn between equally spaced lines of longitude. Each area has two sides formed by intersecting arcs of great circles and the remaining side formed by one of the latitude lines. The areas are alternately prepared with reflecting and nonreflecting (absorbing) surfaces.

A photoemitter/detector assembly is fixed beside the rotor so that the detector normally observes light reflected from the mid-latitude between said two latitudes when the rotor is undisturbed. The output of the detector is a high or low level following the succession of the reflective and nonreflective areas which are intersected by the reflecting point as the rotor spins. When the rotor tilts about an output axis perpendicular to the plane defined by the incident and reflected light paths, the latitude of the reflecting point relative to the rotor is changed such that more reflective areas are encountered than nonreflective areas, or vice versa. As a result, the duration of the high output becomes greater or less than the duration of the low output. The averaged output of the detector is directly proportional to gyro displacement.

In the preferred free rotor embodiment, angular displacement about two output axes is detected by a pair of emitter/detector assemblies observing the same rotor pattern as in the single axis system at points spaced apart by 90°. Each detector is responsive to tilt angles about a corresponding output axis of the gyro. Even if the mid-point of the pattern does not coincide with the equator of the spherical surface, crosscoupling between the two output axes if found to be negligible over useful ranges.

BRIEF DESCRIPTION OF THE DRAWINGS

FIG. 6 is a schematic circuit diagram of the pickoff and shaping circuits.

FIG. 7 is a composite waveform diagram illustrating typical raw, shaped and averaged signals from the photodetector of FIG. 6.

DESCRIPTION OF THE PREFERRED EMBODIMENTS

Figure 1:
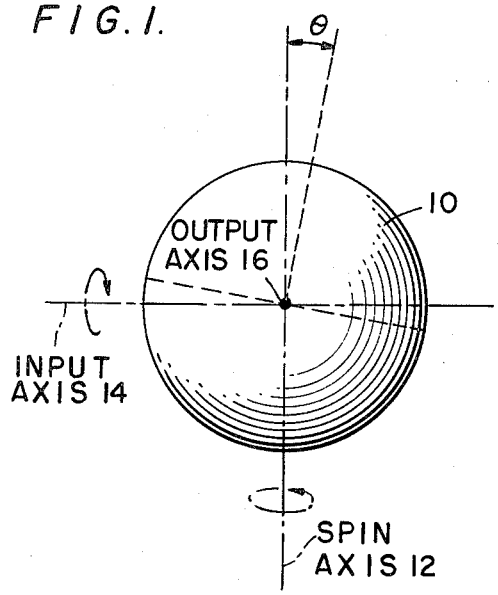
FIG. 1 is a schematic drawing illustrating the operation of a spherical gyro rotor.

FIG. 1 illustrates an idealized spherical gyro rotor 10 which forms an inertial mass spinning continuously about the spin axis 12. Rotation about an input axis 14 perpendicular to the spin axis 12 causes corresponding rotation about an output axis 16 orthogonal to both the spin axis and input axis. The resulting tilt angle θ is a measurement of angular acceleration of the platform (not shown) supporting the rotor about the input axis 14. If the gyro rotor 10 were a "free rotor" with 2 degrees of freedom instead of one, then the output axis 16 in FIG. 1 would also serve as an input axis to induce rotation about the other axis 14 which likewise would double as an output axis. A pick-off device is used to detect the angle θ, and it is this type of device, i.e., for detecting rotation of the rotor 10 about an output axis, to which the invention is specifically directed. All other mechanical and electrical details of gyroscopic systems may be considered, in defining the specific contribution herein, as conventional. Consequently, discussion of the special features and mechanical systems of gyroscopes in general is omitted and left to the understanding of those skilled in the art in order to emphasize the pick-off system disclosed herein.

Figure 2:
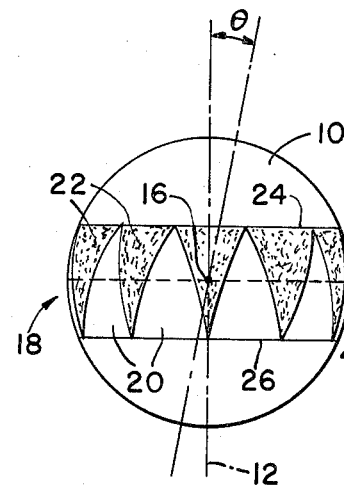
FIG. 2 is a schematic and block diagram illustrating the optical gyro pick-off system according to the invention.

FIG. 2 is a diagram of the basic elements of the pick-off system according to the invention. A spherical gyro rotor 10 is furnished with a special pattern 18 of pseudotriangular reflective and nonreflective areas 20 and 22 wrapped around the spherical surface like a belt. It should be noted that, for purposes of practicing the invention, the only part of the rotor 10 which must have a spherical surface, concentric with the intersecting point of the input, output and spin axes, is the area bearing the pattern 18.

Figure 3A:
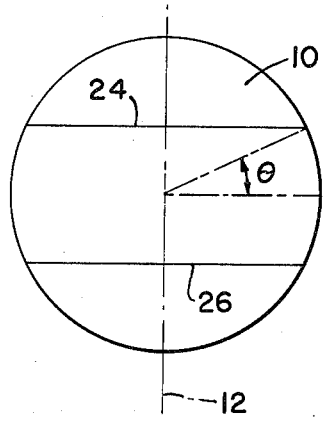
FIGS. 3A, 3B and 3C illustrate the constructional steps for composing the pattern on the spherical surface of FIG. 2.
Figure 3B:
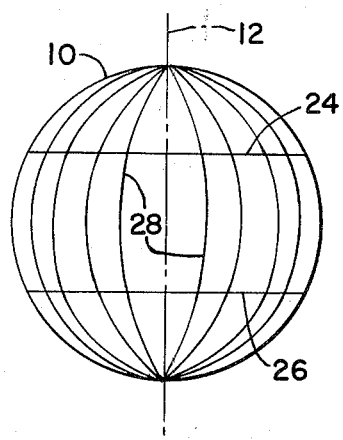
Figure 3C:
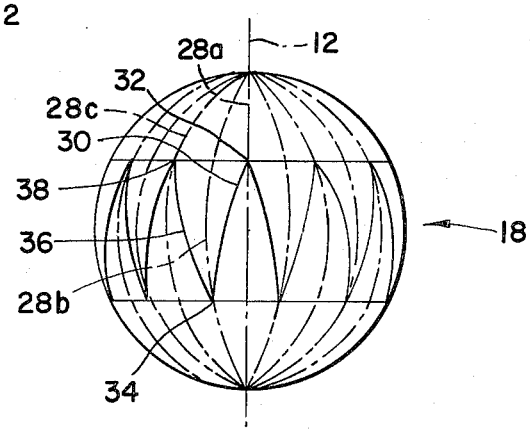

FIGS. 3A, 3B and 3C illustrate the construction of the pattern 18 in three steps. The first step is to choose two lines of latitude on the spherical surface separated by the same angle relative to the center of the sphere as the angular freedom on the gyroscope. Accordingly, if the angle $\theta$ of FIG. 1 is the maximum tilt angle of the gyro in either direction (i.e., $\pm\theta$), then in FIG. 3A latitude lines 24 and 26 separated by twice $\theta$ will be chosen as the outer boundaries of the special pattern 18.

The second constructional step (FIG. 3B) is to draw on the sphere 10 a plurality of equally spaced lines of longitude 28 each bisected by the spin axis 12. Each line of longitude visible in FIG. 3B intersects the latitude lines 24 and 26 described in FIG. 3A.

The final step (FIG. 3C) involves connecting up the intersection points of consecutive longitude lines 28 and latitude lines 24 and 26 using great circle segments (i.e., the shortest distances between the points on the sphere). Beginning with the middle longitude 28a, a segment or arc of a great circle 30 is drawn to connect the intersection point 32 of longitude line 28a and latitude line 24 to the intersection point 34 of the next longitude line 28b and the lower latitude line 26. Next, a second segment 36 of a different great circle is drawn to connect point 34 with the intersection point 38 of the third line of longitude 38c with the upper latitude 24. This process continues by drawing consecutive segments of different great circles from one intersection to the next such that the great circle segments are connected end-to-end in a zigzag pattern defining two sets of similar pseudotriangles, classed according to the direction of their apexes, between the upper and lower latitude lines 24 and 26. Each pseudotriangular area is bounded by two intersecting great circle arcs and one included latitude line segment. The resulting area is a truncated lune, according to the definitions of solid geometry.

In FIG. 2 the stippled area defined by the pseudotriangles 22 having apexes lying on the upper latitude line 24 are caused to be nonreflective with respect to the particular wavelengths of light employed as described below. The nonreflective areas 22 can be provided by using nonreflective paint or other applied coating, by anodizing the surface, by chemically etching the surface or by any other suitable technique which produces a nonreflective or absorptive surface. The other areas, i.e., the pseudotriangular areas 20 having their apexes lying on the lower latitude line 26 are reflective with respect to the wavelengths employed. If the surface of the gyro rotor 10 is machined titanium or vanadium permindor, for example, the surface will be reflective enough in many cases without taking special measures to make it reflective. Otherwise, a reflective material may be applied to the areas 20.

The optical pick-off assembly 40 (FIG. 2) for sensing rotation about the output axis 16 is placed beside the gyro rotor in a fixed position relative to the gyro platform (not shown). The assembly 40 includes a light source 42 and a photodetector 44. The light source 42 aims a beam of light at an incident point 45 through which the surface pattern 18 on spinning rotor 10 turns. The photodetector 44 receives that portion of the light from source 42 reflected from the incident point 45. The point 45 by design lies on the mid-latitude between latitude lines 24 and 26 of the pattern 18 when the gyro rotor is undisturbed about the corresponding output axis, that is, when the tilt angle is 0°. The output of the photodetector 44 is passed to a pick-off circuit 46 which converts the photodetector output to two corresponding voltage levels depending on whether the point 45 intersects a reflective or nonreflective area 20 or 22 at a given point in time. The two level output of the pick-off circuit 46 is passed to a shaping circuit 48 which cleans up the waveform to produce a squarewave output to an analog averaging circuit 50. The circuit 50 compares the amount of time the photodetector output was at one level with the amount of time it was at the other level, representing the amount of time during each rotation of the spinning rotor 10 that the incident point 45 intersected reflecting areas compared to the amount of time it intersected nonreflecting areas. The proportion of time spent traversing reflective versus nonreflective areas is linearly related to the latitude of the incident point 45 on the pattern 18 relative to the mid-latitude of the pattern. As can be seen by inspection, if the gyro rotor 10 were deflected clockwise to the maximum hang-off angle ($+\theta$), point 45 would coincide with the upper latitude line 24 where it would intersect only nonreflective areas. Conversely if the gyro rotor 10 were tilted in the opposite, counterclockwise direction to the maximum hangoff angle ($-\theta$), the point 45 would lie on the lower latitude 26 and would encounter only reflective areas, resulting in low output from the photodetector 44. Between these extremes the latitude of the incident point 45 coincides with correspondingly varying proportions of reflective and nonreflective areas.

Figure 4:
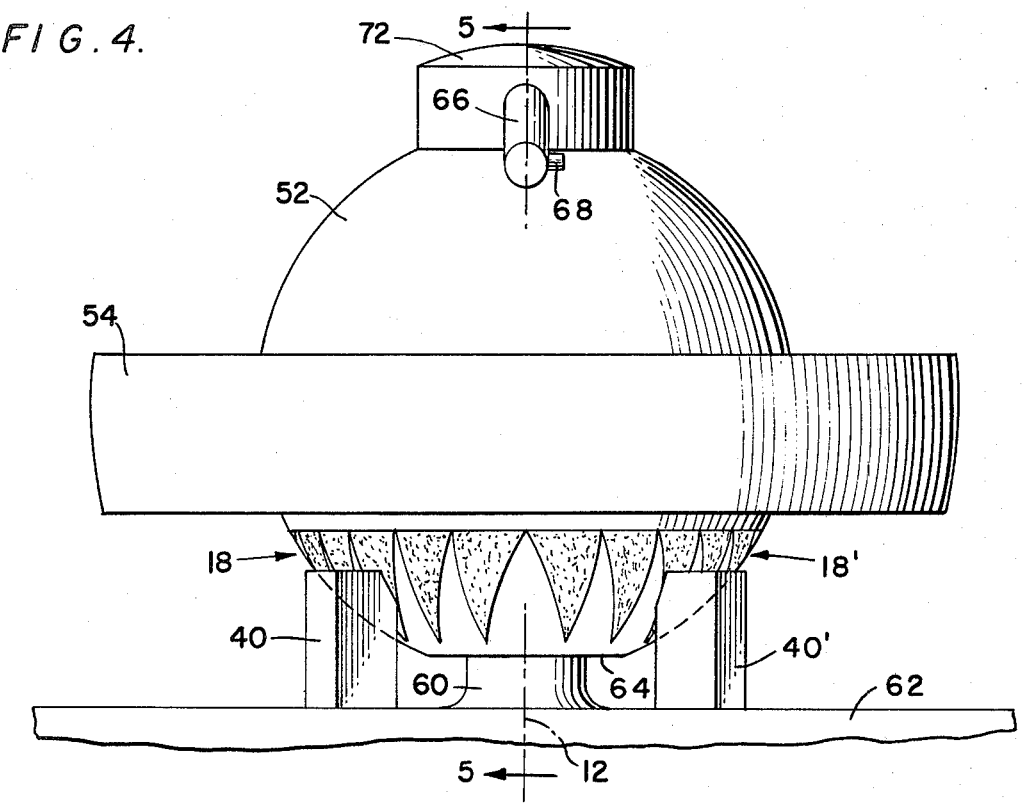
FIG. 4 is a side view of a two-axis gyro adapted according to the invention taken between the output axes.
Figure 5:
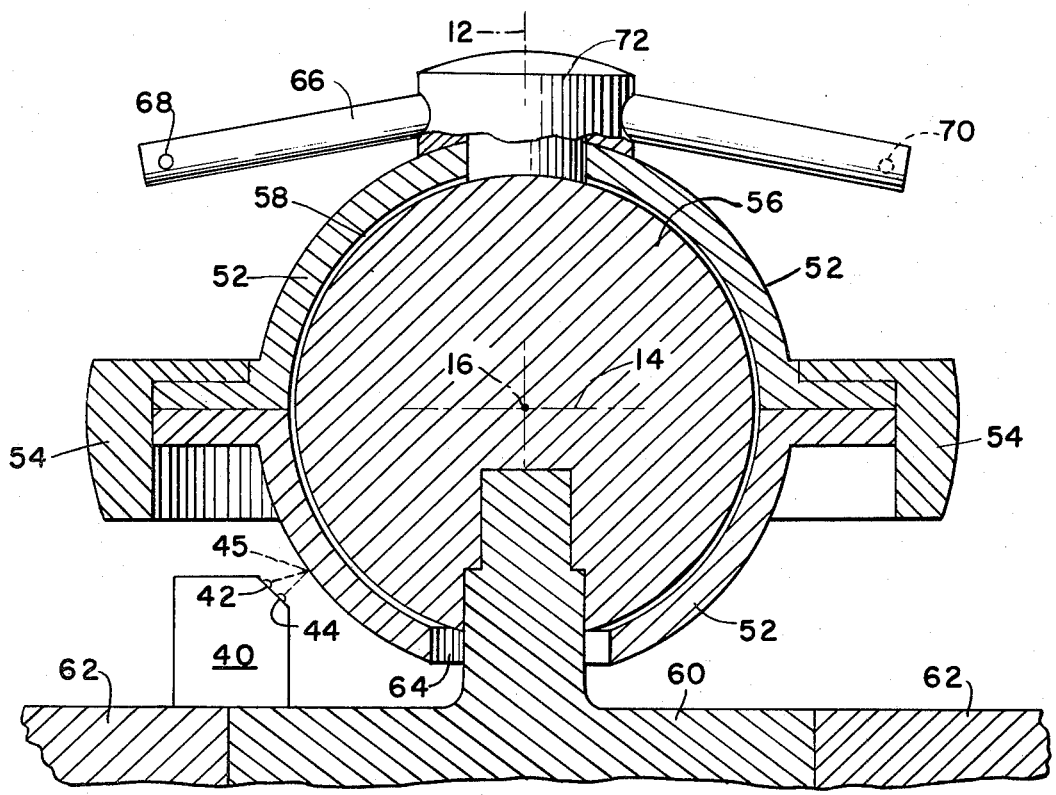
FIG. 5 is a sectional view of the two-axis gyro taken along lines 5—5 of FIG. 4.

FIGS. 4 and 5 illustrate a prior art free rotor two-axis gyro structure adapted to incorporate the pick-off system according to the invention. The gyroscope includes a rotor 52 in the form of a spherical shell with an angular flywheel 54 in the form of a depending flange. The rotor 52 is journaled on a stator 56 in the form of a spherical ball. A spherical, shell-shaped air gap 58 is formed to provide a gas bearing between the rotor 52 and the stator 56 for frictionless rotational support of the spinning rotor 52. The stator 56 is supported by a pedestal 60 affixed coaxially thereto with respect to the spin axis 12 of the rotor 52. The pedestal 60 is removably secured to a gyro base 62. The rotor 52 is free to tilt about two perpendicular axes 14 and 16 orthogonal respectively to the spin axis 12. Either axis serves as the input axis for the other. A circular lower opening 64 in the rotor shell 52 permits rotation about the projecting portion of the pedestal 60 and defines the angular freedom or maximum tilt angle of the rotor.

To maintain constant rotation of the spinning rotor 52, a two-armed sustainer 66 is employed having a pair of oppositely aimed pneumatic exit ports or jets 68 and 70 to propell the rotor 52 with a pinwheel type action. Air is supplied to the air bearing 58 and jets 68 and 70 via suitable air ducts (not shown) formed through the pedestal 60, stator 56 and sustainer 66.

Previously the two axis pick-off for the gyroscope shown in FIGS. 4 and 5 was formed by a pneumatic pick-off arrangement employing four ports symmetrically placed about the spin axis in the cap or button portion 72 of the sustainer 66, blowing air streams across a gap to a stationary four channel fluidic amplifier. The channel outputs were summed and differenced in accordance with well-known quadrant mathematics to determine the two angular deviations with respect to the axes 14 and 16. The prior system is more fully described in U.S. Pat. No. 3,416,378 to Evans et al., assigned to the assignee of this application.

In the present system, the pneumatic pick-off arrangement is completely replaced by the optical system of the invention. Accordingly, the pseudotriangular repetitive pattern of reflective and nonreflective areas 18' is provided on the spherical surface of the rotor 52. To avoid the equatorially placed flywheel and to conserve space, the pattern 18' is displaced downward from the equator of the spherical rotor 52, in what would be the southern hemisphere of the globe. Although the pattern 18' does not straddle the equator as does the pattern 18 in FIG. 2, the pattern 18' is constructed in analogous manner by choosing latitude lines spaced by the angular freedom of the gyro as defined by the opening 64. The vertices of the areas in the pattern are determined by lines of longitude and the non-latitudinal sides of the triangle areas are great circles of the spherical surface.

A pair of optical pick-off assemblies 40 and 40', one for each axis 14 and 16, respectively, each include an infrared emitter 42 and photodetector 44 (FIG. 5). The incident points 45, 45' of each assembly 40, 40' (assembly 40' not being in view in FIG. 5) lie on the same line of latitude on the rotor surface and are separated angularly by 90°. As shown in FIG. 5, the location of the assemblies 40 and 40' below the flywheel 54 allows for compact construction in contrast to the placement of the fluidic amplifier receivers above the button 72 in line with the spin axis 12 as shown in the above-mentioned patent.

FIG. 6 shows embodiments of the pick-off circuit 46 and shaping circuit 48 for the pick-off assembly 40. The corresponding circuits for assembly 40' are identical. In the pick-off circuit 46, a photoemitter diode 42 illuminating point 46 (FIG. 5) is driven by current from a source of voltage, +V limited by a series resistor $R_1$. A phototransistor 44 causes +V volts to be applied across the resistance $R_2$. Transistor 44 is, for example, a silicon phototransistor whose base voltage is controlled in accordance with received infrared light. When light is blocked by an absorbing, nonreflective section of the rotor pattern 18' (FIG. 4), the voltage across resistor $R_2$ drops. The voltage A across resistor $R_2$ is applied to the shaping circuit 48. The shaping circuit 48 includes a standard comparator circuit 74 with associated resistors $R_3$, $R_4$, $R_5$ and $R_6$ for adjusting the input and output levels of the comparator 74. By proper choice of these resistors in accordance with conventional techniques, the output levels may be made symmetrical about zero volts. Thus, an output corresponding to reflection may be +V and the output corresponding to nonreflection may be −V.

With reference to the waveform diagrams in FIG. 7, the raw output signal A from the pick-off circuit 46 (FIG. 6) is shown at A. The shaping circuit 48 smoothes out the ripples by comparing the voltage to a fixed level to produce a corresponding output shown at B in FIG. 7. The A and B waveforms in FIG. 7 correspond to a gyro tilt angle of 0° or null with respect to the axis 16 (FIG. 5). Because of the geometry of the pattern 18' on the rotor surface, at null the output waveform has symmetrical highs and lows. Thus, over a suitable interval of time, the average B' (FIG. 7) of the output waveform B is zero since the shaped output waveform B spends as much time above the zero axis as it does below the zero axis. The average output B' is produced by an analog averaging circuit 50 (FIG. 2) of conventional resistive/capacitive design.

Output waveforms C, D, E and F in FIG. 7 correspond respectively to gyro angles of minus five degrees, plus 5°, minus 10° and plus 10°. Waveform C indicates that the incident point 45 (FIG. 5) is displaced from the mid-latitude of the pattern 18' such that it encounters nonreflective surfaces 75 per cent of the time. Thus, the output C spends three times as much time below the zero axis than it does above it. As shown at C', the average of this signal is therefore minus one-half V. The analogous situation occurs on the other side of the zero axis for a tilt angle of 5°, as illustrated in waveform D. At the maximum excursion or hang-off angle of the gyro, plus or minus 10°, the output waveforms and their averages E, F and E', F' are identical since in one case only reflective surfaces are encountered and the other case only nonreflective surfaces are encountered. The waveform is therefore a continuous DC signal in either case.

In the system of FIGS. 4 and 5, the pattern 18' is nonequatorial, yet crosscoupling between the two output axes is surprisingly low. Small rotations of the rotor 52 purely about axis 16 (FIG. 5) change the reading from pick-off assembly 40 without altering the reading from the other pick-off 40' to any appreciable extent. Of course, the degree of cross-coupling depends on many factors including the level of the midpoint of the pattern below the equatorial plane (the further from the equatorial plane, the more crosscoupling) and the angular freedom of the gyro. In addition, the degree of crosscoupling with a given embodiment is a function of the tilt of the gyro about the cross-axis. For one embodiment designed according to the invention, the amount of cross-coupling at 5° tilt was about 2 percent while at 13° tilt (in excess of the maximum), the amount of crosscoupling was calculated at about 5 percent.

The advantages of the system according to the invention are numerous. The system is extremely low cost compared to prior art optical, fluidic, capacitive or electromagnetic systems. DC excitation is able to be used instead of alternating current; the output signal is directly proportional to displacement for directional control application, and can readily be made digital for interfacing with digital navigation equipment. The device does not add to the length of the gyro because it does not lie in line with the rotor spin axis. Power consumption is negligible, heating is nil and there are no reaction torques on the rotor. There is no theoretical minimum resolution for the pick-off; and in the two-axis embodiment there are no crosscoupling problems in most applications, nor is there cross-talk between the axes. Moreover, the optical pick-off system involves no structural modification of the rotor itself.

The invention may be embodied in other specific forms without departing from its spirit or principle. For example, in place of the analog averaging circuit 50 (FIG. 2), any suitable analog or digital pulse duration modulated signal processing system may be used. The present embodiments are therefore to be considered in all respects as illustrative and not restrictive, the scope of the invention being indicated by the claims rather than by the foregoing description, and all changes that come within the meaning and range of equivalence of the claims are therefore intended to be embraced therein.

I claim:

1. A system for detecting the orientation of a spinning spherical surface, comprising a spherical surface having a diametrical spin axis, a geometric pattern described on said spherical surface between a pair of reference latitude lines relative to said spin axis, said latitude lines being intersected by a plurality of equally spaced reference longitude lines bisected by said spin axis, a plurality of truncated lunes of alternate orientation being defined between said latitude lines by a zigzag pattern of great circle arcs connected end-to-end, each said arc interconnecting the intersecting point of one of said latitude lines and one of said longitude lines with the intersecting point of the other of said latitude lines and the next adjacent longitude line, the areas defined on said surface by one set of truncated lunes of similar orientation having different optical reflectivity than the areas defined by the other set of truncated lunes, a stationary optical detector receiving light reflected from a location through which said pattern turns, said location normally being coincident with the mid-latitude between said spaced latitude lines, the average output level of said detector being indicative of the orientation of said spherical surface relative to an axis orthogonal to said spin axis.

2. A gyroscope of the type having a gyro rotor with spherical outer surface, platform means for supporting said rotor for rotation about a spin axis and permitting tilting of said rotor about a output axis through an angle plus or minus θ relative to a null position, and means for imparting rotation to said rotor about said spin axis, wherein the improvement comprises a gyro pickoff system including a pattern of areas disposed between a pair of latitude reference lines relative to said spin axis spaced from each other angularly by twice θ, said latitude reference lines being divided into equal length segments by means of a plurality of equally spaced reference lines of longitude intersecting said spin axis, a plurality of triangle-like areas of alternate orientation of being defined between said lines of latitude by a zigzag pattern of line segments connected end to end, each line segment interconnecting the intersection of one of said lines of latitude with one line of longitude and the intersection of the other of said lines of latitude with the next adjacent line of longitude, one set of alternate ones of said triangular like areas having different optical properties from the other set of triangle-like areas on the outer spherical surface of said rotor, first receiver means stationary with respect to said platform for receiving radiation reflected from a selected location through which the pattern turns to produce an output signal indicative of the optical properties of said areas passing said location, said pattern having a geometry such that the output of said receiver means is modulated in accordance with the tilt angle of said rotor about a first axis.

3. The system of claim 2, wherein the improvement further comprises second receiver means stationary with respect to said platform for receiving radiation reflected from a location 90° from said selected location observed by said first receiver means to produce an output modulated similarly in accordance with the tilt angle of said rotor about a second axis.

4. The system of claim 2, wherein said zigzag line segments are great circle arcs.

5. The system of claim 2, wherein said triangle-like areas are truncated lunes.

6. The system of claim 2, wherein said one set of areas has different reflectivity from said other set.

7. The system of claim 2, wherein the improvement further comprises signal processing means including means for averaging the output of said receiver means.

8. The system of claim 2, wherein the improvement further comprises a second receiver means stationary with respect to said platform for receiving radiation reflected from a location 90° from said selected location observed by said first receiver means to produce an output modulated similarly in accordance with the tilt angle of said rotor about a second axis.

9. The system of claim 2, wherein said pattern is centered on the equator of said spherical surface relative to said spin axis.

10. The system of claim 2, wherein the mid-latitude of said pattern is displaced from the equator of said spherical surface relative to said spin axis.

11. The system of claim 8, wherein the mid-latitude of said pattern is displaced from the equator of said spherical surface relative to said spin axis.

12. A gyro pick-off system, comprising a free rotor with a spherical outer surface, a platform for supporting said rotor for rotation about a spin axis, means for imparting rotation to said rotor about said spin axis, a pair of perpendicular output axes orthogonal to said spin axis, said rotor being capable of tilting through a maximum angle relative to either output axis, a geometric pattern being provided on said spherical surface of said rotor between a pair of latitude reference lines relative to said spin axis spaced from each other by twice said maximum tilt angle, the mid-latitude between said spaced latitude lines being displaced from the equator of said spherical surface, said latitude reference lines being intersected by a plurality of equally spaced reference lines of longitude bisected by said spin axis, a plurality of truncated lunes of alternate orientation being defined between said latitude reference lines by a zigzag pattern of great circle arcs connected end-to-end, each said arc interconnecting the intersection of one of said lines of latitude and one line of longitude with the intersection of the other of said lines of latitude and the next adjacent line of longitude, the areas defined on said surface by one set of said alternate truncated lunes having different optical reflectivity than the areas defined by the other set of truncated lunes, a pair of optical receivers affixed to said platform receiving light reflected from respective locations through which said pattern turns, said locations being normally coincident with said mid-latitude and separated by 90° so as to correspond respectively to said two output axes, means operatively connected to said optical receivers for separately averaging the levels of light received by said pair of optical receivers to produce outputs indicative of the tilt angles of said rotor relative to said two output axes.

* * * * *